*INVENTORS.*

JOHN PRESPER ECKERT JR.

JOHN W. MAUCHLY

BY George V. Eltgroth

ATTORNEY

DATA TRANSLATING APPARATUS

Filed June 10, 1948 2 SHEETS—SHEET 2

*INVENTORS.*
JOHN PRESPER ECKERT JR.
JOHN W. MAUCHLY
BY
ATTORNEY

Patented Dec. 4, 1951

2,577,141

UNITED STATES PATENT OFFICE 2,577,141

DATA TRANSLATING APPARATUS

John W. Mauchly, Philadelphia, and John Presper Eckert, Jr., Mount Airy, Pa., assignors to Eckert-Mauchly Computer Corporation, Philadelphia, Pa., a corporation of Pennsylvania Application June 10, 1948, Serial No. 32,168

10 Claims. (Cl. 177—380)

This invention relates to data translating apparatus and more particularly to apparatus for translating the condition of a number of circuit controllers into a unique sequence of electrical impulses.

Recent years have witnessed the advent of the high speed digital computer in which electric impulses are utilized in controlling and performing various mathematical operations. The more advanced of these devices are capable of handling hundreds of thousands or even millions of digits per second. With respect to their manner of operation, such computers may be regarded as falling within two general classes; those handling all the digits comprising a number simultaneously in a number of circuits individually accepting and handling the separate digit places, and those using the same equipment for handling each of the various digits, but applying the digital information thereto in a time-spaced relationship. The two types of operation are conveniently designated parallel and sequential, respectively. It will be noted that it is necessary to separate in some manner the numeric information occurring in the different digit spaces of the numbers operated upon. In the parallel type of computer this separation is provided by circuit separation, while in the sequence type of computer the desired separation is secured by a spacing in time while using common circuits. Each of these computer classes presents problems peculiar thereto, but in each of them the tremendous speeds require special attention to the problem of reading in and reading out information. This grows out of the fact that such machines operate with a fixed time base, and that information cannot be manually supplied to such machines at a rate corresponding to their own normal rates of operation. The present invention concerns itself primarily with the problem of the sequence type computer.

It is a primary object of the invention to provide new and novel means for translating the condition of a number of circuit controllers into an impulse sequence.

It is a further object of the invention to provide new and novel means for rigidly relating the impulses comprising the sequence to the machine time-base.

Another object of the invention is to provide new and novel means of utilizing a delay path for translating the condition of a number of circuit controllers into a corresponding impulse sequence.

Figures 1, 2, 3:
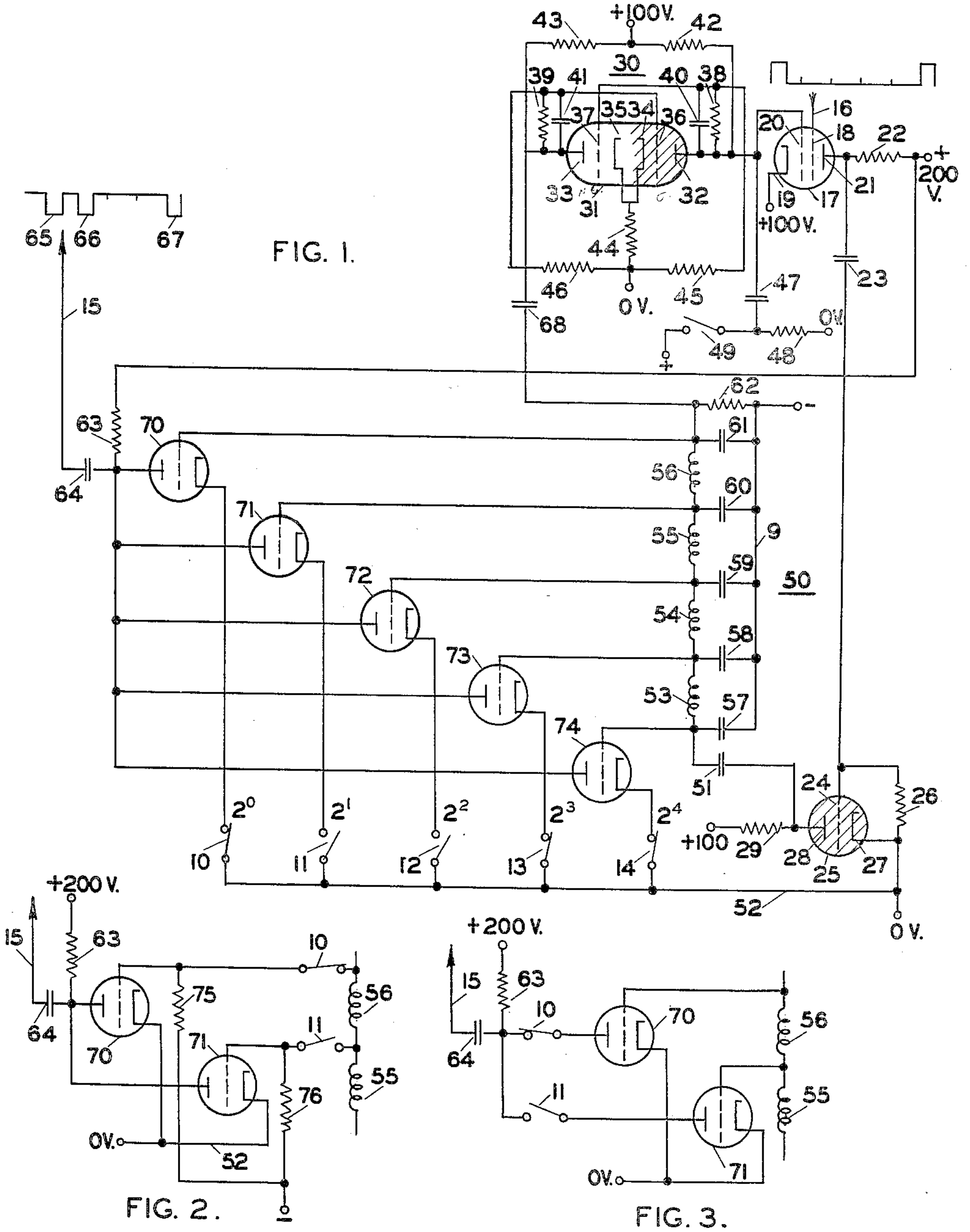
Figure 4:
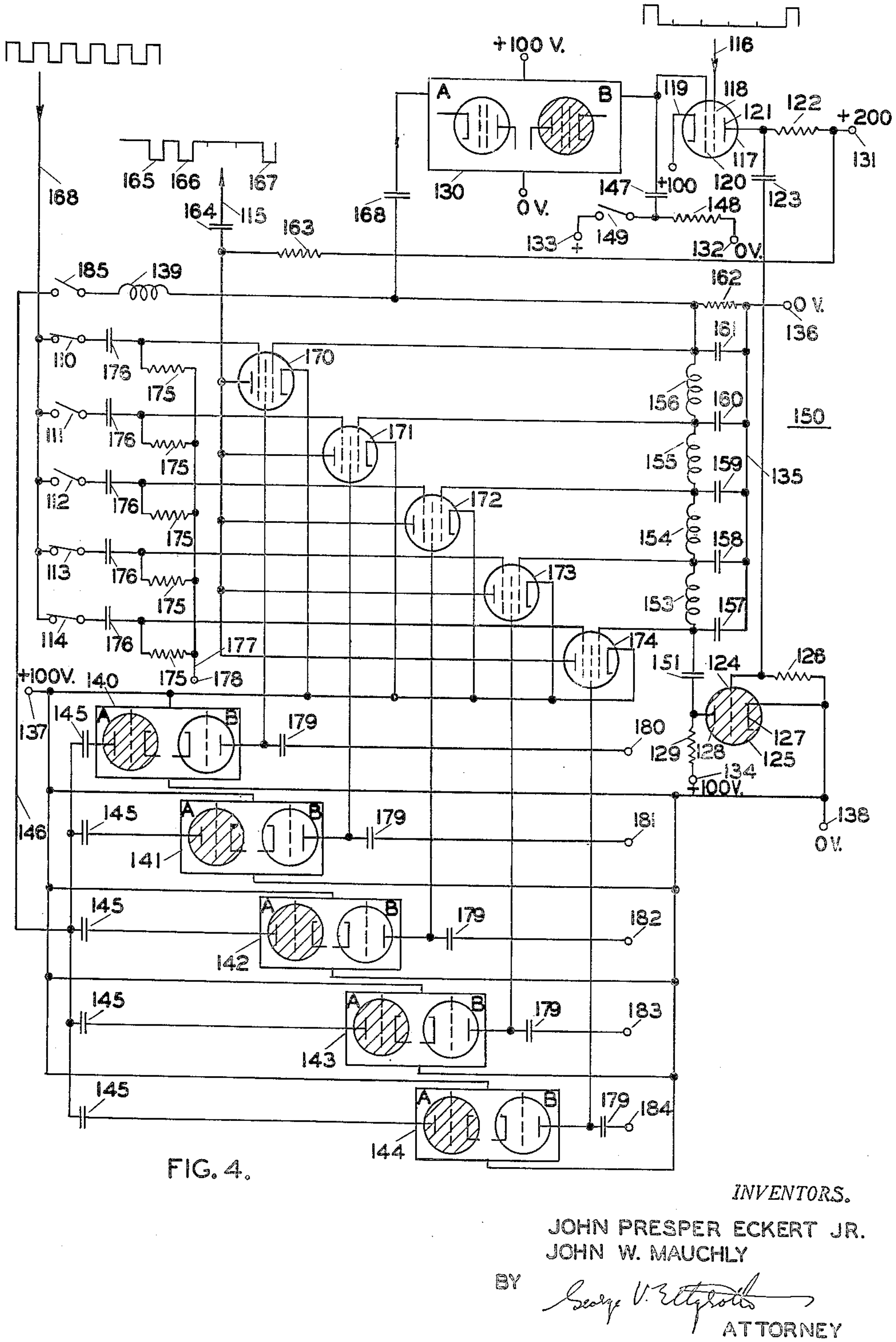

Other objects and advantages of the invention will be in part described and in part be obvious when the following specification is read in conjunction with the drawings in which:

Figure 1 is a schematic diagram of a switch controlled data translating device incorporating the principles of the invention, Figure 2 illustrates an alternative method of governing the operation of the signal transfer links, Figure 3 illustrates a third method of governing the signal transfer link operation, and Figure 4 schematically illustrates data controlled pulse generating apparatus having provisions for rigidly governing the pulse spacing with respect to a machine standard.

The device schematically illustrated in Figure 1 delivers a coded pulse sequence to the signal line 15 under the control of a plurality of circuit controlling devices here illustrated as switches 10–14, inclusive. Exciting pulses, utilized in the generation of the signal impulses delivered to the signal output line 15, arrive along the exciting pulse line 16 connected with the control grid 18 of a gate valve 17. As indicated, these exciting pulses are spaced by a time interval several times greater than their own width or duration. In addition to the grid 18, the valve 17 is also provided with a cathode 19 and anode 21 between which grid 18 and a second grid 20 are situated. The tube 17 is here employed in a manner well-known to the art, the bias on the grids 18 and 20 being such that when either grid is negative, no current will pass between cathode and anode in response to potential variations on the other. The anode 21 of the gating tube 17 is connected with a source of positive potential through the load resistor 22 and also through a coupling capacitor 23 to the control grid 24 of the second valve 25. It should be here noted that the incoming pulses along the exciting impulse line 16 have a positive polarity which overcomes the normally present negative bias on control grid 18, and the cathode 19 of the gating valve 17 is returned to a potential of approximately 100 volts positive. The grid 20 of the valve 17 is connected with an anode 32 of the tube 31 in the well-known flip-flop circuit 30. In addition to the anode 32, the flip-flop 31 is provided with an anode 33, cathodes 34 and 35, and the control grids 36 and 37, the even numbered elements being assembled as a first triode, while the odd numbered elements are assembled as a second triode. The anode 32 is connected with control grid 37 through a resistor 38 paralleled by a capacitor 40, while the anode 393 is connected with control grid 36 through a resistor 39 paralleled by a capacitor 41. The anodes 32 and 33, respectively, are further connected with a positive potential through resistors 42 and 43, while the cathodes 34 and 35 are returned to a relatively lower potential through the resistor 44. A resistor 45 connects the control gril 37 with the low potential end of the cathode resistor 44 and a second resistor 46 connects the control grid 36 with the low potential end of the cathode resistor 44. In addition, a capacitor 47 is connected between the anode 32 and one end of the resistor 48, whose other terminal is connected with a point of relatively low potential. The capacitor end of the resistor 48 is also coupled through a switch 49 with a point of relatively high positive terminal. The switch 49 serves as the read-in switch and may be of the momentary type if desired.

The connection of the resistor 26 between the control grid 24 and cathode 27 of the discharge device 25 establishes substantially zero-bias operating conditions for this valve. Its anode 28 is connected with a source of approximately 100 volts positive potential through a load resistor 29 and may be coupled with a delay line 50 through the capacitor 51. Its cathode 27 may be connected with a point of relatively low potential and is, in addition, linked with one side of each of the circuit-controllers 10–14, inclusive via the line 52. The delay line 50 may take any one of a number of well-known forms. It is illustrated as made up of a plurality of inductors 53–56, each mutually coupled with its neighboring inductor and the capacitors 57, 58, 59, 60, 61 connected individually between the inductor terminals and the common lead 9. A terminating impedance 62 is bridged between the output terminal of the last inductor and the common capacitor lead and linked with a source of potential sufficiently negative to prevent current flow through the signal transfer tubes to be later described. The terminating impedance 62 is chosen in accordance with the well-known rules to minimize reflections.

A number of triodes 70–74 have their control electrode individually connected with taps along the delay line 50. These taps may be so selected as to provide substantially equal delay intervals between the application of a narrow input pulse to successive control electrodes of triode devices 70–74. The anodes of the triodes 70–74 are connected together and to a source of approximately 200 positive volts through a load resistor 63. They are further coupled to the signal output line 15 by the capacitor 64. In addition the cathode of triode 70 is connected with one side of the switch 10, the cathode of triode 71 is normally connected with switch 11, the cathode of triode 72 with switch 12, the cathode of triode 73 with switch 13, and the cathode of triode 74 with switch 14. The other sides of the switches 10–14 are connected through line 52 with the cathode 27.

With the foregoing circuit details in mind, the operation of the apparatus may now be readily understood. Exciting pulses spaced by several pulse times arrive constantly along the exciting line 16 and are delivered to gating tube 17. Normally, however, the even-numbered side of the flip-flop tube 31 is conducting, producing a relatively large voltage drop across the resistor 42. This resistor is returned to a source of approximately 100 volts positive and the cathode 19 of the gating valve 17 is connected to a point of similar potential, whence a substantial bias is impressed upon the grid 20, preventing electron flow between the cathode 19 and the anode 21. At this time, therefore, no signals are delivered through the capacitor 23 to the discharge device 25. Let it be assumed that the switches 10–14 are in the positions shown and that it is desired to deliver a signal to the signal line 15 corresponding thereto. The switch 49 is closed and the resulting charging surge through the capacitor 47 produces a positive surge at the anode 32 and control grid 37. This establishes conduction through the odd-numbered side of the flip-flop tube 31, whereupon the potential of anode 32 becomes much more positive, removing the blocking bias from the control grid 20 of the gating valve 17. Pulses corresponding to the exciting pulses on the line 16 are now delivered, with reversed polarity, through the coupling capacitor 23 to the inverter 25. The resulting current changes through the anode load resistor 29 develop signal pulses of the input polarity, which are then delivered to the input delay line 50. This pulse travels successively through the line sections until it reaches and is absorbed in the terminating impedance 62. It will be noted that the pulse duration is somewhat shorter than the nominal pulse period. The separation of the taps along the delay line 50 is such that the signal energy successively appearing at the taps is progressively delayed in increments approximately equal to the pulse period. This setup is designed to handle pulses spaced by five pulse periods, as illustrated in connection with the illustration of the signal on the exciting impulse line 16. The triodes 70–74 are normally non-conductive, and when the positive pulse from the inverter 25 arrives at the control grid of the triode 74, it gives rise to the output pulse 65 in the representation of the pulses appearing on the signal output line 15. The impulse now travels on down the delay line 50, leaving its input and arriving at the junction between inductors 53 and 54 to excite the control grid of the triode 73, giving rise to another pulse of current through the load resistor 63 resulting in the transmission of a second pulse 66 on the signal line 15 in the second pulse period. Having left the junction between inductors 53 and 54, the impulse next passes to the junction between inductors 54 and 55 to excite the control grid of the coupling triode 72. In this case, however, the triode 72 is disabled by the opening of its cathode circuit at the switch 12, and no corresponding signal impulse is passed to the signal line 15. As the impulse arrives at the junction between inductors 55 and 56 a similar failure to transmit the pulse is observed, resulting in no pulses at either pulse period 3 or pulse period 4. Finally the signal pulse arrives at the terminated end of the delay line 50 to excite the control grid of thermionic valve 70, whose cathode circuit is complete permitting the development of a third pulse 67 on signal output line 15. In addition, the positive pulse appearing across the terminating impedance 62 is coupled to the anode 33 by the coupling capacitor 68 to drive this anode and control grid 36 positive. This transfers the flow of current from the odd-numbered side of flip-flop 31 back to the even-numbered side of flip-flop 31 biasing the control grid 20 of the gating tube 17 strongly negative and interrupting the further flow of exciting impulses therethrough.

Therefore the data sequence set up on the register comprised by switches 10, 11, 12, 13 and 14 is transmitted in the form of electrical impulses to the signal output line 15 once for each closure of the switch 49. The signal transfer links connecting the taps on the delay line 50 with the signal output line 15 may, of course, be effectively disabled by other means, examples of which are shown in Figures 2 and 3. In Figure 2 the cathodes of triodes 70 and 71 are connected directly to a relatively low potential while the controlling switches 10 and 11 are connected between the taps on the delay line 50 and the control electrodes of their corresponding triodes. This arrangement, however, requires the addition of resistors 75 and 76 connected between the control grids and a source of relatively negative potential to maintain the tubes 70 and 71 in normally nonconducting state. Still another variation is to be seen in Figure 3, where the control electrodes of triodes 70 and 71 are directly linked as before with the taps on the delay line 50, but the switches 10 and 11 are now situated in the connection between the triode anodes and the load resistor 63, the cathode being again returned to a point of relatively low potential. It may be noted that the register of switches in Figure 1 is situated out of the path of signal flow whereas the design of Figures 2 and 3 places the switches directly in the path of signal flow. This latter arrangement may be acceptable in a limited range of applications, but is somewhat inferior to the arrangement of Figure 1 in faithfully retaining the original input wave forms. It is indeed conceivable that the register of switches might have been connected directly between the taps on the delay line 50 and the signal output line 15 were it not for the fact that the bilateral flow of energy through the switches would give rise to multiple paths and reflections vitiating the fidelity of the output signal pulses.

As will by now have been observed the heaters associated with the thermionic cathodes of the discharge valves have been omitted to preserve the simplicity of the illustration, as have the power supplies delivering the necessary potentials, since the details of this portion of the structure are well known to those skilled in the art and form no part of the present invention. For the same reason the showing of the coupling networks has been restricted to conventional resistance-capacity combinations, it being again understood that the usual broad-banding arrangements employing series and/or shunt-peaking may be employed where the frequencies are such as to indicate their desirability.

The more elaborate configuration of Figure 4 affords correspondingly improved performance characteristics. As before a gating valve 117 has its control grid 118 connected with the exciting impulse line 116 and a control grid 120 connected with the flip-flop 130 here illustrated in block form. The cathode 119 of the gating valve 117 may, as before, be connected with the terminal serving as the anode supply point for the anodes of the flip-flop 130. A load resistor 122 is connected between the positive supply point 131 and the anode 121 of the gating tube 117 while the anode 121 is also linked to the control grid 124 of the inverter tube 125 through the coupling capacitor 123.

The buffer inverter valve 125 is operated under substantially zero bias condition by virtue of the connection of a resistor 126 between the control grid 124 and cathode 127. Its anode 128 is connected with the positive supply point 134 through the load resistor 129. A suitable power supply delivers approximately 100 volts positive to the supply point 134. In addition, anode 128 is connected with the input of the delay line 150 through a coupling capacitor 151. As in the previous illustration the delay line may be constituted of mutually coupled, series connected inductors 153, 154, 155 and 156 shunted by the capacitors 157–161 bridged between the inductor terminals and a common line 135. The delay line 150 is terminated by the connection of a suitable terminating impedance 162 between the inductor line and the common capacitor lead 135. One side of the terminating impedance 162 is connected to a suitable source of bias potential at 136 while its remaining terminal is connected with "A" side of the flip-flop 130 through the coupling capacitor 168 in addition to its connection with one lead of the delay element 139. A plurality of multiple grid valves 170–174 are operatively associated with the delay line 150, the inner grid of valve 170 being connected with the terminated end of the delay line, the inner grid of valve 171 being connected with the junction between inductors 155 and 156, the inner grid of valve 172 being connected with the junction between inductors 154 and 155, while the inner grid of valve 173 is connected with the junction between inductors 153 and 154 and the inner grid of valve 174 is connected with the input to the delay line 150. In practice the presence of wiring and tube capacities may make possible the elimination of the capacitors 157 and 161 located at the input and output ends, respectively, of the delay line 150. The cathodes of the discharge devices 170–174 may be connected together and to the supply point 137 which is maintained at a positive potential of approximately 100 volts. The anodes of the multiple grid valves 170–174 may be connected together and thence to the supply point 131 through the common load resistor 163 while the output signal impulses are delivered to the signal line 115 through the coupling capacitor 164. The second grid of the discharge devices 170–174 may be connected to the "B" side of the flip-flop register 140–144. As shown in the diagram the "A" side of the flip-flops 140–144 is normally active and a positive potential therefore appears on the second grid of the multiple grid valves just referred to. The outermost grids of the discharge devices 170–174 may be connected to a timing pulse line 168, through capacitors 176 and switches 110, 111, 112, 113 and 114, respectively. If the proper bias potential is present on the timing pulse line 168, it is permissible to omit the isolating capacitors 176. In either case however it may be necessary to provide grid resistors 175 having one end connected with the outer grid of its associated valve and the other end connected with the common line 177 connected with a suitable source of bias potential at 178. The parameters of the valves 170–174 and the operating biases applied to the grid elements are so selected that an impulse is passed to the anode circuit only when all the grids are positive. This is a well-known form of coincidence gate.

The end of the delay element 139 remote from the terminating impedance 162 connected with the delay line 150 is linked through the lead 146 and switch 185 in common to the coupling capacitors 145 connected with the "A" side of the flip-flops 140–144. The "B" side of the flip-flops 140–144 may be connected through capacitors 179 to the respective control terminals 180–184. By applying positive pulses from any suitable source to the register input terminals 180–184 it is possible to actuate the "B" side of the flip-flops 140–144 in any desired combination to control the nature of the impulses delivered to the signal line 115 as will be later described in detail.

The inner structure of flip-flops 130 and 140–144 may be substantially identical with the detailed showing of such an element in Figure 1 and similar provisions are made for transferring conduction from the "B" side of flip-flop 130 to the "A" side of this flip-flop. This takes the form of a capacitor 147 connected with one terminal of the resistor 148 whose other terminal is connected at 132 with a reference potential point. In addition, the capacitor terminal of the resistor 148 is connected through a normally open switch 149 with the point 133 normally maintained at a potential positive with respect to the terminal 132.

With the foregoing information relative to Figure 4 in mind, its various modes of operation may be readily perceived. There are at least two obvious methods for use of this impulse-generating apparatus and they will be discussed separately. Let it first be assumed that all circuit elements have the condition illustrated in the schematic diagram, that is, the "B" side of the flip-flop 130 is conducting current while the "A" sides of flip-flops comprising the register 140–144 are conducting, switches 110, 113 and 114 are closed, switches 111, 112 and 185 are open. Assume that it is now desired to deliver an impulse sequence to the signal line 15 corresponding to the switching register 110–114, the switch 149 is closed momentarily, bringing the capacitor end of 148 to a positive potential and causing the passage of the charging pulse through capacitor 147 to transfer conduction from the "B" side of the flip-flop 130 to the "A" side of the flip-flop 130. This applies a positive potential to the grid 120 of the gating valve 117, and with the arrival of the next exciting impulse on the line 116 a negatively poled pulse is delivered from its anode circuit through the coupling capacitor 123 to the control grid 124 of the buffer-inverter 125. This in turn gives rise to a positively poled pulse across the load resistor 129, which is delivered to the input of the delay line 150 to travel along the same until it is absorbed in the terminating impedance 162. Let it here be remembered that the exciting pulses are spaced in this example by five pulse periods and have a duration that is somewhat less than a pulse period. The positive pulse appearing on the inner grid of the multiple-grid valve 174, coupled with the already positive potential of the intermediate grid arising from the fact that "B" side of flip-flops 140–144 is inactive, prepares the valve 174 for the passage of anode current as soon as the gating or timing pulse arrives on the line 168 and is transferred to the outer grid through switch 114 and capacitor 176. The input pulse to the delay line will not at this time appear at valves 170–173 and hence the appearance of a timing pulse at their outer grids does not result in the flow of anode current through the load resistor 163. Thus only the multiple-grid valve 174 is active at this time. The beginning of the pulse, it will be seen, is controlled by the rise of the timing impulse on the gating pulse line 168, as is its termination. This is especially true as the impulse delivered by the delay line may have been broadened somewhat by its passage through additional circuit elements. After the lapse of one pulse period the delay line impulse is now at the inner grid of the valve 173 and the arrival of the gating impulse on the line 168 again gives rise to an output impulse across the load resistor 163 and to the signal line 115 through the capacitor 164. The passage of the second pulse period brings the impulse to the inner grid of the valve 172. As revealed by inspection of Figure 4, the switch 112 connecting the outer grid of this valve with the gating line is open and hence no impulse will be developed across load resistor 163. The same conditions obtain after the lapse of the third pulse time which brings the signal to the inner grid of valve 171 which is similarly disabled because switch 111 is in the open position. The fourth pulse time brings the impulse to the inner grid of the valve 170 to prepare it for conduction in response to the gating impulse arriving from line 168 through closed switch 110 and capacitor 176. These operations give rise to the successive impulses through 165, 166 and 167, pictorially associated with the signal line 115. When the positive impulse on the delay line arrive at terminating impedance 162, it is also delivered to the "A" side of the flip-flop 130 through the capacitor 168 to transfer conduction back to the "B" side of the flip-flop 130, reducing the positive potential on the grid 120 of the gating tube 117 to a point preventing the further delivery of impulses in the anode circuit corresponding to the exciting impulses on the line 116. The delay line impulse is delivered as well to the input terminal of the delay element 139 at this time, but with the circuit conditions assumed this plays no further part in the operation of the apparatus.

However, when the switch 185 is in the closed condition, the delay line impulse is delivered through the delay element 139 to the clearing line 146 to clear the flip-flop registers 140–144. With the registers 140–144 cleared, conduction is assumed by the "B" side of the flip-flop effectively biasing related inputs of the gates 171–174 to close them. Thus, signal transfer gates 170–174 are rendered nonresponsive to subsequent exciting impulses transmitted along the delay line 150 by the flip-flop registers 140–144 until they are again set up with conduction on the "A" side by the application of the necessary positive impulse to the register input terminals 180–184.

The operation of the manual register 110–114 is easy of comprehension but obviously not capable of performing in a manner utilizing the full capacity of truly high-speed digital computers. Hence another type of relatively high-speed register comprising the flip-flops 140–144 may be advantageously employed. If this type of use is contemplated for the pulse generating equipment, the switches 110–114 are all closed or may be replaced by permanent connections. The normal condition of the flip-flop register 140–144 for this type of operation is not that illustrated, but is one in which the "B" sides of the respective flip-flops conduct current. The flip-flop may be prepared or placed in this normal condition by impressing a positive pulse on the line 146 transferring conduction from the "A" side to the "B" side thereof. The intermediate grids of all the gating valves 170–174 are now biased sufficiently negative with respect to their associated cathodes to effectively prevent the delivery of any signal impulses therefrom. The desired binary number or pulse combination is now set up by delivering positive pulses to the appropriate ones of the register impulse terminals 180-184. Let it be assumed that positive pulses have been delivered through register impulse input terminals 180, 183 and 184 to transfer conduction back to the "A" sides of the flip-flops 140, 143 and 144. The intermediate grids of gating valves 170, 173 and 174 are therefore positive with respect to their associated cathodes and no longer act to permanently lock out these gating valves. When operating with the flip-flop register the switch 185, in the line 146, is left open if the register is not to be cleared after delivery of each pulse sequence and closed if it is desired to perform this clearing operation.

As before, the reading operation is initiated by closure of the switch 149 to pass a positive charging pulse through capacitor 147 to the "B" side of the flip-flop 130 and effectively applying a positive potential to the grid 120 of the gating valve 117. Upon arrival of the next succeeding impulse through the exciting impulse line 116, a negatively poled pulse is developed across the anode load resistor 122 and delivered through the coupling capacitor 123 to the buffer-inverter 125, in whose output circuit a corresponding positively poled pulse appears, which is then delivered to the input of the delay line 150. The delay line is so proportioned that each section provides a delay substantially equal to one pulse period. The arrival of the delay line impulse at the gating valve 174 drives its inner grid positive. The intermediate grid of this valve is already positive, hence with the arrival of a positive gating impulse along the line 168 and through the switch 114 and capacitor 176, the tube 174 draws anode current, generating the pluse 165 across load resistor 163, which is passed to the signal line 115 through coupling capacitor 164. Because of the delay characteristics of the line 150, the delay pulse will not have yet arrived at the inner grids of gating valves 170-173 which, therefore, do not participate at this time. After the lapse of the first pulse period the delay line pulse is impressed on the inner grid of the gating valve 173 whose intermediate grid is also positive and it too delivers an anode current pulse upon the arrival of a positive gating impulse from the line 168 through switch 113 and coupling capacitor 176. As before, the delay line impulse will not have reached gating valves 170-172 and will have already departed from the inner grid of gating valve 174 whereby these latter tubes are effectively removed from operation. The lapse of the second pulse period brings the delay line impulse to the gating valve 172. It has earlier been specified, however, that the "B" side of the flip-flop is conducting and hence its intermediate grid is negative with respect to the cathode effectively preventing the development of a signal pulse in the third space. The passage of the third pulse period brings the delay line impulse to the gating valve 171 whose intermediate grid is similarly negative with respect to its cathode thus preventing the developing of a signal impulse in the fourth pulse space. The lapse of the fourth pulse brings the delay line impulse to the terminating impedance 162 and the inner grid of the gating valve 170 whose intermediate grid is positively biased, as the flip-flop 140 is conducting on the "A" side. This gives rise to the development of a pulse 167 in the fifth pulse period in response to the arrival of the positive gating impulse over the line 168 through the switch 110 and capacitor 176. The positive pulse appearing across the terminating impedance 162 is also delivered to the flip-flop 130 through the coupling capacitor 168 on its "A" side and it transfers conductance back to the "B" side of the flip-flop, effectively biasing the grid 120 of the gating valve 117 strongly negative with respect to its associated cathode 119, preventing the further passage of exciting impulses through this tube. In addition the output pulse across the terminating impedance 162 passes through the delay element 139 and the closed switch 185, line 146 and the coupling capacitors 145 to the "A" sides of the flip-flops comprising the register 140-144. This clears the flip-flop register by transferring conduction to "B" sides of all the flip-flops, thereby placing such a bias on the intermediate grids of the gating valves 170-174 as to prevent the further passage of impulses. The flip-flop register 140-144 may again be set up in any manner by the application of the necessary positive impulses to the register input terminals 180-184. The delay provided in the delay element 139 is substantially equal to the duration of the gating pulses on the line 168 and its purpose is to prevent closing the gating valve 170 before the completion of transmission of a pulse therethrough. It is not necessary to delay the clearing of the flip-flops associated with the gates 171-174 since their function will have been previously performed. Therefore, it is possible to place the delay element 139 either in the line 146 or in the individual connection to the flip-flop 140. If it is desired to transmit the same number to the signal line repeatedly, the switch 185 in the clearing line 146 is left open, and the reading switch 149 pressed as many times as it is desired that the register number be read out.

In the illustrated embodiment, a single tapped transmission line has been employed for the development of the spaced reading pulses. It will be obvious however, that if desired, individual delay lines characterized by different delay times might connect the output of the buffer-inverter with the respective gating valves 170-174. Such a modification could also be employed in the apparatus of Figure 1. Furthermore, although a relatively elemental form of impulse generating apparatus for the initiating of the read-in apparatus has been shown, it is clear that any available source of suitable positive impulses may be employed for this purpose. In addition the choice of pulse polarity is one of convenience and pulses of a negative polarity might be used as satisfactorily as those of positive polarity, with minor modifications.

Hence, it is clear that there will be many modifications and variations not departing essentially from the principle of the invention obvious to those skilled in the art. One such modification would be the replacement of the electric discharge devices used as signal links in Figure 1 with switches operating in circuits with sufficiently high attenuation to reduce the effect of reflections and multipath signals on the line 50 to a tolerable level.

What is claimed is:

1. In impulse generating apparatus, a passive signal delay line characterized by a predetermined delay interval and provided with a plurality of connections along its length, a device delivering conditioning impulses to said delay line spaced in time by an amount at least equal to the delay interval of said signal delay line, and of duration less than said delay interval, an output signal line, a plurality of signal transfer gates each having an output lead connected with said output signal line and at least two input leads, said signal gates being conditioned to deliver an output signal by the presence of coinciding signals of selected polarity on said input leads, means connecting the first input lead of each of said signal transfer gates with a respective connection of said signal delay line, a plurality of data responsive registers characterized by a first state and a second state, each of the said registers in the first state conditioning the second input lead of a respective one of said gates, means for selecting the state of each of said data responsive registers, and a signal transfer gate disabling device conditioned by an impulse applied from said signal delay line to render said signal transfer gates nonresponsive to subsequent conditioning impulses.

2. In impulse generating apparatus, a passive signal delay line characterized by a predetermined delay interval and provided with a plurality of connections along its length, a device controlled to deliver a single conditioning impulse to said delay line having a duration less than the delay interval of said signal delay line, an output signal line, a plurality of signal transfer gates each having an output lead connected with said output signal line and at least two input leads, said signal gates being conditioned to deliver an output signal by the presence of coinciding signals of selected polarity on said input leads, means connecting the first input lead of each of said signal transfer gates with a respective connection of said signal delay line, a plurality of data responsive registers characterized by a first state and a second state, each of the said registers in the first state conditioning the second input lead of a respective one of said gates. means for selecting the state of each of said data responsive registers, and a signal transfer gate disabling device excited by the conditioning impulse applied to the first input lead of one of said signal transfer gates to render said signal transfer gates nonresponsive to subsequent conditioning impulses.

3. In impulse generating apparatus, a passive signal delay line characterized by a predetermined delay interval and provided with a plurality of connections along its length, a device delivering conditioning impulses to said delay line spaced in time by an amount at least equal to the delay interval of said signal delay line and of duration less than said delay interval, an output signal line, a plurality of signal transfer gates each having an output lead connected with said output signal line and at least two input leads, said signal gates being conditioned to deliver an output signal by the presence of coinciding signals of selected polarity on said input leads, means connecting the first input lead of each of said signal transfer gates with a respective connection of said signal delay line, a plurality of data responsive registers each having a setup state and a clear state, each of said registers in the setup state conditioning the second input lead of a respective one of said gates, means for selectively setting up said data responsive registers, and a register clearing apparatus activated by an impulse applied from said signal delay line to clear said data responsive registers.

4. In impulse generating apparatus, a passive signal delay line characterized by a predetermined delay interval and provided with a plurality of connections along its length, a device delivering conditioning impulses to said delay line spaced in time by an amount at least equal to the delay interval of said signal delay line and of duration less than said delay interval, an output signal line, a plurality of signal gating valves each having an output lead connected with said output signal line and at least two input leads, said signal gating valves being conditioned to deliver an output signal by the presence of coinciding signals of selected polarity on said input leads, means connecting the first input lead of each of said signal gating valves with a respective connection of said signal delay line, a plurality of flip-flop circuits each having a setup state and a clear state and provided with setup and clear input leads, each of the said circuits in the setup state conditioning the second input lead of a respective one of said signal gating valves, means connected with the setup input leads for selectively setting up said flip-flop circuits, and a signal delaying link connected between the first input lead of one of said signal gating valves and the clear input leads of said flip-flop circuits.

5. In impulse generating apparatus, a signal transfer gate having at least two input leads and an output lead, said signal gate being conditioned to deliver an output signal by the presence of coinciding signals of selected polarity on said input leads, an exciting line delivering impulses spaced by a predetermined time period exciting the first input lead of said signal transfer gate, a signal responsive register having a setup state and a clear state and provided with setup and clear input leads, said register in the setup state conditioning the second input lead of said signal transfer gate, a signal line for delivering setup signals to the setup input lead of said signal responsive register, and a signal delay device characterized by a delay interval less than the period of impulses on said exciting line and embracing an input lead connected with the output lead of said signal transfer gate and an output lead connected with the clear input lead of said signal responsive register.

6. In impulse generating apparatus, a selector signal gate having at least two input leads and an output lead, said selector signal gate being conditioned to deliver an output signal by the presence of coinciding signals of selected polarity on said input leads, an exciting line delivering impulses spaced by a predetermined time period and having a predetermined duration exciting the first input lead of said signal transfer gate, a signal responsive register having a setup state and a clear state and provided with setup and clear input leads, said register in the setup state conditioning the second input lead of said signal transfer gate, a signal line for delivering setup signals to the setup input lead of said signal responsive register, a passive signal delay line characterized by a delay interval less than the time period of impulses on said exciting line but more than the duration of said impulses and provided with an input lead connected with the output lead of said selector signal gate an output lead connected with the clear input lead of said signal responsive register and a plurality of connections along its length, an output signal line, a plurality of signal transfer gates each having an output lead connected with said output signal line and at least two input leads, said signal gates being conditioned to deliver an output signal by the presence of coinciding signals of selected polarity on said input leads, means connecting the first input lead of each of said signal transfer gates with a respective connection of said signal delay line, a plurality of data responsive registers characterized by a first state and a second state, each of the said registers in the first state conditioning the second input lead of a respective one of said gates, means for selecting the state of each of said data responsive registers, and a signal transfer gate disabling device conditioned by an impulse applied from said signal delay line to render said signal transfer gates nonresponsive to subsequent conditioning impulses.

7. In impulse generating apparatus, a passive signal delay line characterized by a predetermined delay interval and provided with a plurality of connections along its length, a gating pulse source delivering impulses having a period less than the delay interval of said delay line, a device governed by said gating pulse source delivering conditioning impulses to said delay line spaced in time by an amount at least equal to the delay interval of said signal delay line and of duration less than said interval, an output signal line, a plurality of signal transfer gates each having an output lead connected with said output signal line and at least two input leads, said signal gates having the property of delivering an output signal in the presence of coinciding impulses on said input leads, means connecting the first input lead of each of said signal transfer gates with a respective connection of said signal delay time, means selectively connecting the second input leads of said signal transfer gates with said gating pulse line, and a signal transfer gate disabling apparatus conditioned by a pulse applied from said signal delay line to render said signal transfer gates noresponsive to subsequent coinciding input impulses.

8. In impulse generating apparatus, a passive signal delay line characterized by a predetermined delay interval and provided with a plurality of connections spaced along its length in substantially equal delay subintervals, a gating pulse source delivering impulses having a period substantially equal to a delay subinterval of said signal delay line, a device governed by said gating pulse source delivering conditioning impulses to said delay line spaced in time by an amount at least equal to the delay interval of said signal delay line and of duration not exceeding said subintervals, an output signal line, a plurality of signal transfer gates each having an output lead connected with said output signal line and at least two input leads, said signal gates having the property of delivering an output signal in the presence of coinciding impulses on said input leads, means connecting the first input lead of each of said signal transfer gates with a respective connection of said signal delay line, means selectively connecting the second input leads of said signal transfer gates with said gating pulse line, and a signal transfer gate disabling apparatus conditioned by a pulse applied from said signal delay line to render said signal transfer gates nonresponsive to subsequent coinciding input impulses.

9. In an electric signalling network, a source of electric impulses spaced substantially equal predetermined periods of time, a transmission device characterized by a transmission delay embracing a plurality of said periods of time and provided with output connections spanning substantially an integral number of said periods of time, apparatus governed by said source of electric impulses supplying impulses spaced in time by an amount at least equal to said transmission delay to the input of said transmission device, a gating link having first and second input connections and responsive only in the presence of stimuli on both of said input connections, a connection between said source and said first gate input connections, a connection between one of the output connections of said transmission device and said second gate input connection, and a load device connected with the output of said gating link.

10. An impulse generating apparatus, a passive signal delay time characterized by a predetermined delay interval and provided with a plurality of connections along its length, a gating pulse source delivering impulses having a period less than the delay interval of said delay line, a device governed by said gating pulse source delivering conditioning impulses to said delay line spaced in time by an amount at least equal to the delay interval of said signal delay line and of duration less than said delay interval, an output signal line, a plurality of signal transfer gates each having an output lead connected with said output signal line and at least three input leads, said signal gates having the property of delivering an output signal in the presence of coinciding signals of selected polarity on said input leads, means connecting the first input lead of each of said signal transfer gates with a respective connection of said signal delay line, means connecting the second input leads of said signal transfer gates with said gating pulse line, a plurality of data responsive registers each having a setup state and a clear state, each of said registers in the setup state conditioning the third input lead of a respective one of said gates, means for selectively setting up said data responsive registers, and a register clearing apparatus activated by an impulse applied from said signal delay line to clear said data responsive registers.

JOHN W. MAUCHLY.
JOHN PRESPER ECKERT, Jr.

REFERENCES CITED

The following references are of record in the file of this patent:

UNITED STATES PATENTS

| Number | Name | Date |
| --- | --- | --- |
| 2,199,634 | Koch | May 7, 1940 |
| 2,210,577 | Fitch | Aug. 6, 1940 |
| 2,403,561 | Smith | July 9, 1946 |
| 2,409,229 | Smith | Oct. 15, 1946 |
| 2,418,521 | Morton | Apr. 8, 1947 |
| 2,456,825 | Fitch et al. | Dec. 21, 1948 |
| 2,543,874 | Shenk | Mar. 6, 1951 |